United States Patent Office 3,504,686
Patented Apr. 7, 1970

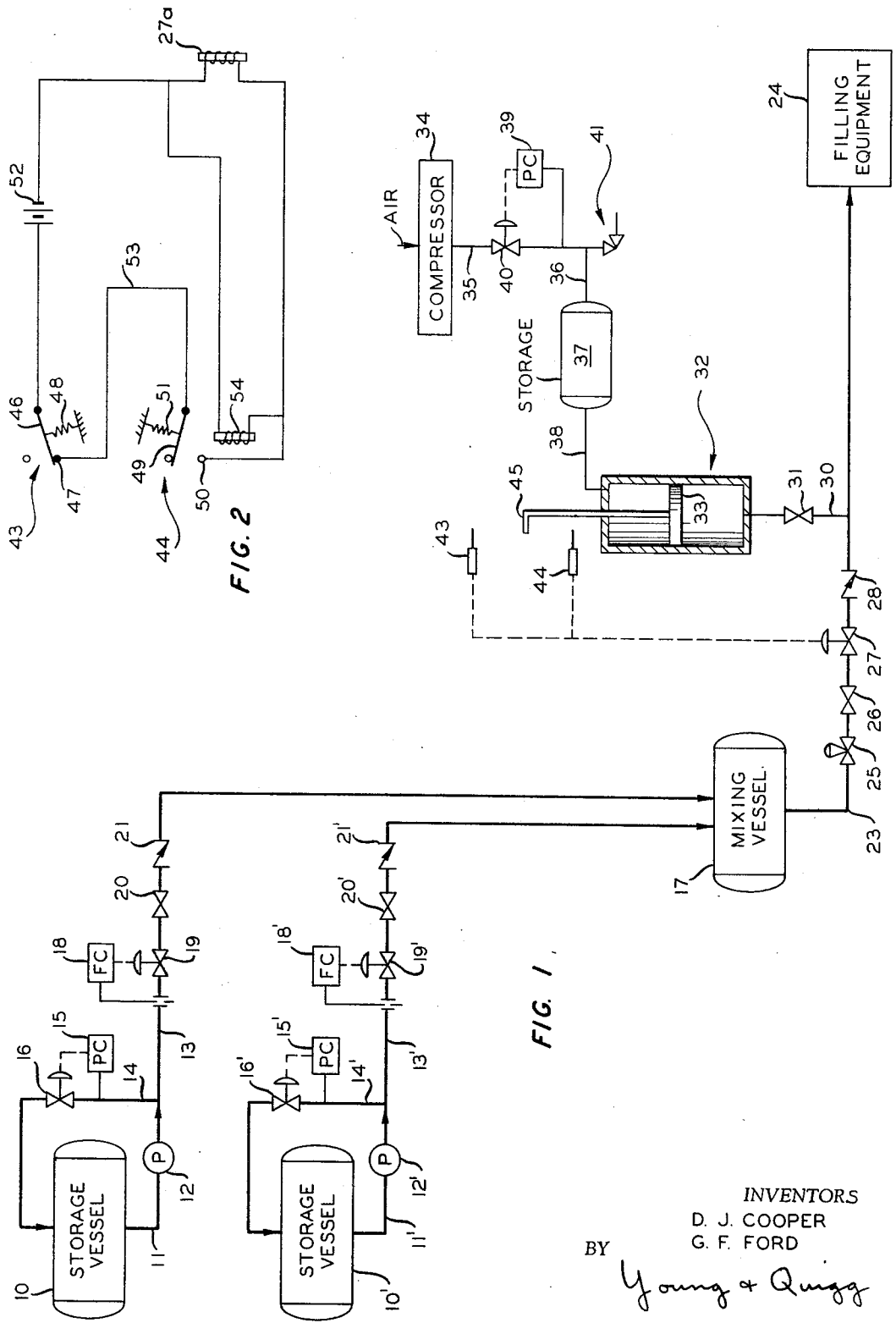

3,504,686
FLUID BLENDING SYSTEM
Delbert J. Cooper and George F. Ford, Bartlesville, Okla., assignors to Phillips Petroleum Company, a corporation of Delaware
Filed Oct. 9, 1967, Ser. No. 673,606
Int. Cl. E03b 5/00, 11/00; F17d 1/00
U.S. Cl. 137—3                    4 Claims

ABSTRACT OF THE DISCLOSURE

Two or more fluid streams are passed at constant rates to a mixing vessel, and the resulting mixture is delivered to a point of utilization. An accumulator is connected to the delivery conduit to receive excess flow. The accumulator contains a movable piston which actuates control mechanism to regulate a valve in the delivery conduit.

---

This invention relates to the blending and transferring of fluid mixtures.

In various industrial operations there is a need for systems which are capable of blending fluid streams and for delivering the blend to the point of utilization. For example, many aerosol propellants are formed of mixtures of normally gaseous materials, such as propane, butane and various fluorinated hydrocarbons. The resulting mixtures must be blended accurately in order to meet specifications of the final product, and it is often desirable to blend the mixtures immediately prior to the time that the aerosol packages are to be filled. This requires blending apparatus which is capable of being used in conjunction with the filling equipment.

In U.S. Patent No. 3,298,383 there is disclosed a fluid blending system which is particularly useful for forming blends of aerosol propellants. In this system, two or more fluid streams are passed to a mixing chamber under controlled flow rates, and the resulting mixture is withdrawn for use as required. While this system provides accurate blends of fluid streams, a problem is sometimes encountered when it is necessary to deliver the final product at variable rates. This results from the fact that the flow controllers generally have maximum accuracy over fairly limited flow ranges. If the flows are outside these ranges, there is some loss in accuracy. This problem is overcome in accordance with the present invention by the addition of an accumulator to the delivery line. The individual streams are passed to the mixing chamber at preselected rates which are within the accurate ranges of the individual flow controllers. In the event that the final blend is not required at the same rate as the streams are blended, the excess is stored in an accumulator until needed. Conversely, the fluid blend can be withdrawn from the accumulator in the event the product is required at a rate greater than the streams are blended. The accumulator is designed so as to deliver the fluid blend at a constant pressure.

Accordingly, it is an object of this invention to provide an accurate method of blending and delivering fluid mixtures.

Another object is to provide novel storage means in a fluid delivery line to compensate for fluctuations in flow rates.

Other objects, advantages and features of the invention should become apparent from the following detailed description, taken in conjunction with the accompanying drawing in which:

FIGURE 1 is a schematic representation of an embodiment of the fluid blending system of this invention. FIGURE 2 is a schematic circuit drawing of an embodiment of the control circuit employed in the system of FIGURE 1.

Referring now to the drawing in detail and to FIGURE 1 in particular, there is shown a first storage vessel 10 which is adapted to contain a liquefied petroleum gas such as propane. Vessel 10 is provided with an outlet conduit 11, which has a pump 12 therein, and which communicates with two conduits 13 and 14. Conduit 14 communicates with an inlet of storage vessel 10, and is provided with a pressure controller 15 which regulates a valve 16. Conduit 13 communicates with the inlet of a mixing vessel 17. A flow controller 18 is associated with conduit 13 and adjusts a valve 19 to maintain a predetermined fluid flow rate through the conduit as long as fluid is withdrawn from vessel 17, as hereinafter described. A shutoff valve 20 and a check valve 21 are also disposed in conduit 13. Pump 12 normally removes fluid from vessel 10 at a rate greater than that required by flow controller 18. The excess flow is returned to vessel 10 through conduit 14. In this manner, a constant pressure is maintained in the system upstream of flow controller 18.

A second storage vessel 10' is provided to supply a second liquefied gas, such as a fluorinated hydrocarbon. A conduit system identical to that described above is associated with vessel 10' and corresponding elements are designated by like primed reference numerals. Thus, the two fluids are delievered to vesel 17 at preselected rates. If desired, a ratio controller can be associated with flow controllers 18 and 18' to maintain a constant ratio between the two flows. Furthermore, additional fluids can be added to vessel 17 by similar systems if a blend having more than two constituents is desired. Vessel 17 can be provided with suitable agitation means to ensure thorough mixing of the fluids.

An outlet conduit 23 extends from mixing vessel 17 to a point of utilization, such as aerosol container filling equipment 24. A pressure regulator 25, a cutoff valve 26, a control valve 27, and a check valve 28 are disposed in conduit 23.

A conduit 30, which has a cutoff valve 31 therein, extends between conduit 23 and one end of an accumulator 32. Accumulator 32 is provided with a movable piston 33 which serves to divide the accumulator into two chambers when the piston occupies an intermediate location within the accumulator, as illustrated. The outlet of an air compressor 34 is connected by conduits 35 and 36 to a storage tank 37. A conduit 38 extends from storage tank 37 to the second end of accumulator 32. A pressure controller 39, which adjusts a valve 40 in conduit 35, maintains the compressed air in storage tank 37 at a predetermined pressure. A relief valve 41 is connected to conduit 36.

In normal operation, the apparatus is designed such that the fluid mixture is delivered from vessel 17 at a rate which is approximately equal to the rate at which the fluid mixture is utilized in equipment 24. Valve 27 is open at this time. However, accumulator 32 is provided to accommodate fluctuations in demand without requiring changes in the rate of flow of the fluids through conduits 13 and 13'. If the mixture is delivered from vessel 17 at a rate greater than required by equipment 24, the excess enters the lower chamber of accumulator 32 and displaces piston 33 upwardly. Valve 31 is normally open. If filling equipment 24 requires the mixture at a greater rate than it is delivered from vesel 17, the air pressure in storage tank 37 pushes piston 33 downwardly to supply additional mixture from the accumulator. Two switches 43 and 44 are positioned adjacent accumulator 32 so as to be actuated by an arm 45 which is connected to piston 33. These switches control the operation of valve 27.

A suitable electric control circuit for actuating valve 27 is illustrated schematically in FIGURE 2. Switch 43 comprises an arm 46 which engages a contact 47 when closed. Spring 46 is normally biased in this closed position by a spring 48. Switch 44 comprises an arm 49 which engages a contact 50 when closed. Switch arm 49 is normally biased in an open position by a spring 51. Switch arm 46 is connected to the first terminal of a voltage source 52. A lead 53 connects terminal 47 to switch arm 49. Solenoids 54 and 27a are connected in parallel with one another between terminal 50 and the second terminal of voltage source 52. Solenoid 27a controls valve 27, either directly or through an appropriate valve actuating mechanism. When solenoid 27a is energized, valve 27 is opened.

If piston 33 initially occupies an intermediate location, such as shown in FIGURE 1, the switches of FIGURE 2 occupy the positions illustrated so that solenoids 54 and 27a are deenergized and valve 27 is closed. At such time filling equipment 24 is supplied with fluid mixture from accumulator 32. Piston 33 moves downwardly as this fluid is withdrawn until arm 45 moves switch arm 49 into engagement with terminal 50. This energizes the solenoids. Solenoid 54 retains switch arm 49 in engagement with terminal 50, and solenoid 27a opens valve 27 to permit fluid to flow from vessel 17 into accumulator 32 and to filling equipment 24. Any introduction of fluid into accumulator 32 moves piston 33 upwardly. However solenoid 54 keeps switch arm 49 in engagement with terminal 50 after arm 45 moves out of engagement with switch arm 49. The control circuit remains in this configuration until such time as arm 45 may engage switch arm 46 to open switch 43. When this occurs the circuit to the solenoids is broken so that valve 27 is closed and switch 44 is opened. This prevents excess fluid from entering accumulator 32. The fluid mixture is then withdrawn from accumulator 32 until such time as arm 45 may once again engage switch 44. In normal operation, piston 33 occupies an intermediate position with solenoids 27a and 54 energized. Accumulator 32 thus "floats" on delivery conduit 23 to compensate for relatively minor fluctuations in the delivery rate.

While this invention has been described in conjunction with a presently preferred embodiment, it should be apparent that it is not limited thereto.

What is claimed is:

1. In a fluid blending system which includes a mixing vessel, first means communicating with an inlet of said vessel to introduce a first fluid at a preselected rate, second means communicating with an inlet of said vessel to introduce a second fluid at a preselected rate, and outlet conduit means communicating with an outlet of said vessel to withdraw a blend of said first and second fluids; apparatus to permit introduction of said first and second fluids into said mixing vessel at generally constant rates when the blend is removed at variable rates, which apparatus comprises: an accumulator; a piston positioned within said accumulator for movement therethrough, said piston dividing said accumulator into first and second chambers; connecting conduit means communicating between said outlet conduit means and one end of said accumulator; means exerting a force on said piston tending to move said piston toward said one end; a valve in said outlet conduit means between said mixing vessel and said connecting conduit means; and means responsive to the position of said piston in said accumulator to regulate said valve.

2. The apparatus of claim 1 wherein said means to regulate said valve comprises first and second switches, means connected to said piston to actuate said first switch when said piston is adjacent said one end of said accumulator and to actuate said second switch when said piston is adjacent the second end of said accumulator, and control means actuated by said switches to close said valve when said second switch is actuated and to open said valve when said first switch is actuated.

3. The apparatus of claim 1 wherein said means exerting a force on said piston comprises a tank, means connecting said tank to the one of said chambers of said accumulator on the side of said piston adjacent the second end of said accumulator, and means to maintain air under constant pressure in said tank.

4. In a method of mixing fluids and delivering the mixture to a point of utilization by passing a first fluid at a generally constant rate to a mixing zone, passing a second fluid at a generally constant rate to said mixing zone, withdrawing the resulting blend from said mixing zone, and passing such blend to a point of utilization; the method of compensating for fluctuations in demand at the point of utilization, which comprises in combination with passing said fluid blend to said point of utilization passing said fluid blend withdrawn from said mixing zone to a storage zone at such times as said fluid blend is withdrawn from said mixing zone at greater rates than required at the point of utilization, passing said fluid blend from said storage zone to the point of utilization when said fluid blend is required at said point of utilization at a rate greater than the rate at which said fluid blend is withdrawn from said mixing zone, and terminating flow of said fluid blend from said storage zone when a predetermined amount of said fluid blend occupies said storage zone.

References Cited

UNITED STATES PATENTS

| 686,341 | 11/1901 | Rockwood | 137—568 |
|---|---|---|---|
| 1,931,791 | 10/1933 | Dueringer | 137—593 |
| 3,017,922 | 1/1962 | Peterson | 137—568 |
| 3,298,383 | 1/1967 | Cooper | 137—3 |

HENRY S. JAUDON, Primary Examiner

U.S. Cl. X.R.

137—568, 593